(12) United States Patent
Nageli et al.

(10) Patent No.: US 7,144,603 B2
(45) Date of Patent: Dec. 5, 2006

(54) PROCESS FOR MANUFACTURING A FILM-TYPE PACKAGING MATERIAL

(75) Inventors: Hans-Rudolf Nageli, Neuhausen (CH); Karolina Rosenberger, Osterfingen (CH); Juerg Frey, St. Gallen (CH); Fabian Bonsch, Neuhausen (CH)

(73) Assignee: Alcan Technology & Management Ltd. (CH)

( * ) Notice: Subject to any disclaimer, the term of this patent is extended or adjusted under 35 U.S.C. 154(b) by 350 days.

(21) Appl. No.: 10/674,000

(22) Filed: Sep. 30, 2003

(65) Prior Publication Data
US 2004/0067305 A1    Apr. 8, 2004

(30) Foreign Application Priority Data
Oct. 7, 2002   (EP) ................... 02405866
Nov. 25, 2002  (EP) ................... 02406019

(51) Int. Cl.
   B05D 1/04   (2006.01)
   B05D 1/28   (2006.01)
(52) U.S. Cl. .................. 427/466; 427/469; 427/485; 427/208.2

(58) Field of Classification Search ................ 427/466, 427/469, 485, 208.2
See application file for complete search history.

(56) References Cited

U.S. PATENT DOCUMENTS 6,342,273 B1 *   1/2002  Handels et al. ............. 427/475
6,376,148 B1 *   4/2002  Liu et al. .................... 430/124

FOREIGN PATENT DOCUMENTS

EP         1186961       3/2002

* cited by examiner

*Primary Examiner*—Fred J. Parker
(74) *Attorney, Agent, or Firm*—Fisher, Christen & Sabol

(57) ABSTRACT

A process for manufacturing a flexible packaging material from a single or multi-layer film or film-type laminate containing a sealing layer of powder-type starting material deposited on at least one free surface of the film or film-type laminate. The sealing layer is deposited locally, i.e., over only those parts of the surface to be sealed, and the deposition of the sealing layer takes place by an electrostatic coating process in which coating particles are electrostatically charged and transferred to the film surface to be coated by applying an electric field, and melted and/or hardened to give a coating film in the form of a sealing layer.

24 Claims, 2 Drawing Sheets

PROCESS FOR MANUFACTURING A FILM-TYPE PACKAGING MATERIAL

This application has priority benefit of European Patent Application Number 02406019.6, filed Nov. 25, 2002, that has priority of European Patent Number 02405866.1, filed on Oct. 7, 2002.

BACKGROUND OF THE INVENTION

1. Field of the Invention

The present invention relates to a process for manufacturing a film-type packaging material, a device for carrying out the process and the use of the packaging material.

2. Background Art

Various forms of packaging with sealing seam closures are widely used as the production of such closures is extremely simple and cost-favorable, and, e.g., in many cases meet the requirements of one-way packaging.

The production of so-called sealing lacquer coatings on films or film-type laminates is as a rule carried out using conventional lacquer deposition methods such as e.g. roll-coating, immersion coating or nozzle-spray coating. Also known is the deposition of sealing lacquer coatings using intaglio printing methods. The coating is normally deposited over the whole surface area. This means that also areas of the packaging material which are not intended to be sealing areas are also coated with a sealing lacquer. Using a so-called intaglio printing method it is also possible to deposit the sealing layer locally i.e. over only part of the surface.

The sealing coatings are, e.g., cold-sealing or hot-sealing lacquers. Cold-sealing lacquers normally have a latex-base and are employed especially for heat-sensitive goods. Hot-sealing lacquers which are adhesives that can be activated thermally are, e.g., in the form of polymers. They are, as a rule, deposited on the packaging material in the form of solutions (lacquers) or in the form of films of a polymeric material.

The conventional production methods suffer the disadvantage that the sealing layers or sealing lacquer layers can be deposited only over the whole surface or only to a limited extent over part of the surface. Further, setting up the production facilities for localized deposition of the sealing layer is complicated, therefore, local deposition can not simply be changed at will. Further, solvent containing lacquers are not completely free of problems from the environmental standpoint and should, therefore, be replaced by solvent-free coating systems.

BROAD DESCRIPTION OF THE INVENTION

The object of the present invention is, therefore, to propose a manufacturing process and a device which enable localized deposition of sealing lacquer layers or sealing layers whereby the pattern of locally deposited sealing layer can be changed without excessive cost or expenditure of time.

That objective is achieved by way of the invention in that the sealing layer is deposited locally on the areas to be sealed, and the deposition takes place using an electrostatic coating process, in which coating particles are electrostatically charged and, using transfer involving the application of an electric field, are transferred to the film surface to be coated and melted to give a coating film in the form of a sealing layer, and subsequently solidified.

DETAILED DESCRIPTION OF THE INVENTION

The sealing layer is preferably a hot-sealing layer. The starting materials for producing the sealing layer by an electrostatic process are in the form of dry particles i.e. powder particles, and preferably in the form of a powder paint. The coating particles usefully exhibit tribo-electric properties i.e. they can be electrostatically charged.

The powder particles or the powder lacquer particles preferably comprise or contain thermoplastic polymer which can be melted. The powder particles or powder lacquer particles may also be tribo-modified, i.e., the particles contain additives which enable the particles to be highly electrostatically charged by means of friction. The powder particles or powder lacquer particles may also contain additives, such as, filler materials, pigments, antioxidants or stabilizers and further functional additives. The use of powder particles or powder lacquer particles enables solvent-free coating systems to be employed.

The hot-sealing layers as adhesives that can be thermally activated are e.g. polyolefin based (co)polymers such as ethylene, (meth)acrylates, vinylchloride, vinylidenchloride, and vinylacetate as well as polyamides, polyesters and polyurethanes and mixtures (polyblends) thereof.

The hot-sealing layer may e.g. contain or comprise of a polyvinylchloride (PVC), a polyvinylidenchloride (PVDC), a co-polymer of PVC, in particular a co-polymer of PVC with an acrylic resin, a polypropylene (PP), a polyester, a polychlor-trifluor-ethylene (PCTFE) or a cyclo-olefin (COC).

After deposition on the film or film-type laminate by means of an electrostatic process, the powder particles or the powder lacquer particles are melted under the influence of heat and form a flat film in the form of a coating, which on cooling solidifies as a non-sticking hot-sealing layer. The adhesive properties of the hot-sealing layer are re-activated only on melting under the influence of heat during the sealing operation.

The powder particles or powder lacquer particles are thereby, in a preferred version of the invention, after transfer to the substrate (plastic film) heated e.g. to 70–80° C. and melted in a so-called heating unit e.g. by means of IR (infra-red) radiation or NIR (near infra-red) radiation, in particular by means of heated rolls. As a result of melting, a fine, uniform film that adheres to the substrate is formed. The heating unit is usefully appointed to the sealing station in which the sealing layer is deposited.

The localised deposition of the sealing layer is performed preferably by means of an electrophotographic process. To that end, the sealing station preferably contains means for electronic data processing which permits specific partial-area, i.e., localized deposition of the sealing layer on the basis of a printer's copy.

The sealing station may also contain means which can monitor the thickness of the layer to be deposited and/or regulate the same. The regulation of the thickness of the layer or localized layer to be deposited is performed preferably by means of digital printing technology.

The local deposition of a layer is usefully based on the printer's copy which reproduces the arrangement of the area to be sealed. The data for the printer's copy are preferably available in digital form and are, e.g., created or reworked e.g. by desktop-publishing means, i.e., by means of programs for image processing or the like involving equipment for electronic data processing (EDP).

The data may be stored, e.g., on a magnetic, magneto-optical or optical storage medium. It is also possible to store electronically a printer's copy which is in analogue data form using appropriate means, such as, EDP equipment and data processing programs (e.g. scanner equipment), and to transform this into digital signals and process this further by means of an analogue-digital transformer. The data of the printer's copy present in digital form are usefully reproduced via an electrophotographic process in the form of the above partial area deposition of a layer on the film or film-type laminate.

By digital processing, via appropriate data processing programs, the printer's copy may be worked over and altered with the aid of EDP in an almost unlimited manner.

The thickness of the sealing layer is, e.g., 7–100 μm, in particular 10–50 μm. The sealing layers may be deposited on one or both free surfaces of the film or film composite.

The sealing layer may be deposited in-line, in a coating station in an integral module of a foil production line. The coating of the film with a sealing layer preferably takes place in a continuous foil production process. The said production line may feature further stations, such as a printing station, a laminating station and/or a station for deposition of a lacquer overlayer coating. Further, following on from the production line may be a cutting station and/or a packing station in which the endless packaging film is cut and processed into forms of packaging.

The sealing layer station preferably contains a coating unit in which the sealing layer is deposited locally on the film or film-type laminate using the so-called electrostatic process and, downstream of the coating unit, a heating unit in which the coating, in particular powder lacquer coating, is heated and melted to give a uniform sealing film that adheres to the film surface, and subsequently is solidified by cooling.

The film-type laminate manufactured according to the invention may be manufactured as a monofilm or a multi-layer film or film-type laminate. The films may be, e.g., of metal (metal foils, thin metal layers), paper, plastic or a combination thereof. The film laminate may contain layers of material out of paper, metal or plastic. Examples of metal foils as packaging materials are foils of iron, steel, copper and preferably aluminum and its alloys.

If the sealing lacquer layer is deposited locally, i.e., over only part of an aluminum foil, care should be taken that, at least those areas of the aluminum foil which are not covered by the sealing lacquer coating, are coated with a pre-treatment layer, preferably a pre-treatment layer of a polymer, such as a pre-lacquer coating, in order to avoid corrosion arising from rubbing.

Suitable plastics for plastic films or layers are e.g. polyvinylchloride (PVC), polyvinylidenchloride (PVDC), polyesters, polycarbonates, polyvinylacetates, polyolefins and in particular polyethylene (PE), and also polypropylenes (PP) and polyamides (PA). Further plastics not listed here are also conceivable.

The thickness of the packaging material may e.g. range from 5 μm to 1000 μm. Useful are thicknesses of 15 to 200 μm. The film or film-type laminate may also contain barrier layers e.g. thin ceramic layers.

The invention also relates to a production device for manufacturing a flexible packaging material out of a single or multi-layer film or film-type laminate, whereby the production device contains at least a continuous film production line with a sealing station for depositing a sealing layer on at least one free surface of the packaging material.

The production device is characterized in that the sealing layer station contains means for coating the films or film-type laminate using an electrostatic coating process.

The means for electrostatic coating usefully contain means for electrostatic charging the coating particles and means for transferring the electrostatically charged coating particles to the film surface (substrate) to be coated.

The means for transferring the electrostatically charged coating particles comprise preferably a rotatable transfer roll or transfer belt on which the electrostatically charged coating particles are deposited by electrostatic forces and means for applying an electric field to transfer the electrostatically charged coating particles from the transfer roll or transfer belt to the film surface to be coated.

For that purpose the coating particles may be part of a two-component developer system with a carrier. The coating particles may, however, be part of a single-component developer system. Here "developer system" means a deposition system in which the particles are deposited on the substrate to be coated. Developer system has nothing to do here with the curing/hardening of the sealing layer.

The transfer of the coating particles to the film surface is carried out preferably by means of a process employing so-called EMB-Technology (Electro-Magnetic Brush Technology) such as is employed in particular in two-component developer systems. Here, a so-called carrier is employed in the form of ferromagnetic particles, whereby the coating particles are attached to the carrier by tribo-electrical forces. The developer system, comprising the carrier and the coating particles adhering to them, is deposited over a rotating magnet roll facing the transfer roll or transfer belt. As a result of the magnetic forces acting between the magnet roll and the carrier, the developer system is drawn in a chain-like manner to the magnet roll and forms a brush-like arrangement, also known as magnet brush. The magnet brush strokes the transfer roll and creates a so-called brush effect as a result of which the coating particles are transferred, with the aid of electrostatic forces, to the electrostatically charged surface of the transfer roll.

In the transfer process itself the coating particles are transferred e.g. by means of corona discharge, directly or indirectly from the transfer roll to the substrate to be coated. The coating particles are then fixed to the substrate if desired in the molten state.

The electrostatic process for local deposition of the sealing layer is preferably an electrophotographic coating process. The transfer roll is in this case in the form of a photo-carrier, preferably in the form of a drum, roll or transfer belt. The photo-carrier is coated on the surface with a photo-conductor. At a corona discharging station the photo-conducting surface layer of the photo-carrier is uniformly charged in darkness. The photo-conducting layer is exposed to a light source which reproduces the image in light form, whereby the illuminated part of the photo-conducting layer is discharged. A charge-image corresponding to the printer's copy image is produced.

In the developing stage the electrostatically charged coating particles are transferred to the charge-image, whereby the coating particles—which are charged with a charge opposite that of the photo-conducting layer—are drawn onto the charge-image on the photo-carrier under the action of the electrostatic forces, thus reproducing the print image. The coating particles are then transferred via electrostatic attraction from the photo-carrier directly or indirectly onto the substrate.

Processes which by definition fall into the category of electrophotographic processes include direct and indirect electrophotographic processes such as e.g. xerography, whereby an indirect electrophotographic process, in particular a xerographic process, is employed by way of preference.

The sealing coating station preferably contains means for electronic data processing for the purpose of monitoring and/or controlling deposition of a layer over part of the surface area and for monitoring and/or controlling layer thickness. Further the sealing layer station usefully contains means for image processing.

The image processing means preferably comprise means for electronic data processing (EDP)—in particular, image processing programs for creating printer's copies, The printer's copy is preferably in digital form.

The flexible packaging material manufactured according to the invention is preferably employed for the production of sealable forms of packaging, in particular pouch-type packaging such as flat pouches, flat-bottom bag pouches, standing pouches, large and small bags, cushion-type packs, and sacks. Further, the film-type laminate may also be employed to manufacture supports for goods, boxes, base parts for push-through packs, blister packs or lid materials for containers or supports for goods.

The flexible packaging material manufactured by the process according to the invention may also be a lid-film (push-through film or peelable film) of a blister pack. To advantage, the push-through film contains a foil of aluminum or an aluminum alloy, hereinafter—for simplicity—aluminum foil. The push-through film may be an aluminum foil in hard or soft condition. The aluminum foil may be, e.g., aluminum of a purity level of 98.6% or higher. Further, the aluminum foil may be of an aluminum alloy of the AA 8XXX type, such as AA 8014, or AA 8079. The aluminum foil may, e.g., have a thickness of 10 to 100 µm, in particular, 15 to 50 µm.

The aluminum foil of the said push-through film contains on its inner lying side, i.e. on the side facing the contents, a hot-sealing layer deposited by the process according to the invention. The hot-sealing layer may, e.g., be of a PVC (polyvinylchloride) or of a poly-blend (mixture) of PVC and another polymer. The hot-sealing layer may also be a copolymer of PVC, in particular a copolymer of PVC with an acrylic resin. Other additives, such as, methylacetate and/or butyl-acetate, may be added to the said copolymer.

In order to avoid corrosion due to rubbing, at least those areas of the aluminum foil that are not covered with the sealing layer are preferably provided with a pre-treatment layer of a polymer such as a pre-lacquer. The pre-treatment layer may also be deposited over the whole surface area of the aluminum foil, whereby in that case the sealing layer is situated on the pre-treatment layer.

A covering pre-treatment layer of the above-mentioned kind is also foreseen when the sealing layer is of pure PVC, as this is known to bond unsatisfactorily to an aluminum surface.

The outer lying side of the aluminum foil, i.e., the side facing away from the contents of the packaging, preferably contains a pre-treatment layer, e.g., in the form of a polymer or a lacquer, and printing on top of that. Instead of a pre-treatment layer, the outer side of the aluminum foil may also feature a plastic film and the printing on top of the plastic film. If desired, a protective lacquer coating or print overlayer may be provided on top of the printing.

BRIEF DESCRIPTION OF THE DRAWINGS

The invention is described in the following by way of examples and with reference to the accompanying drawing which shows in.

DETAILED DESCRIPTION OF THE DRAWINGS

Figure 1:
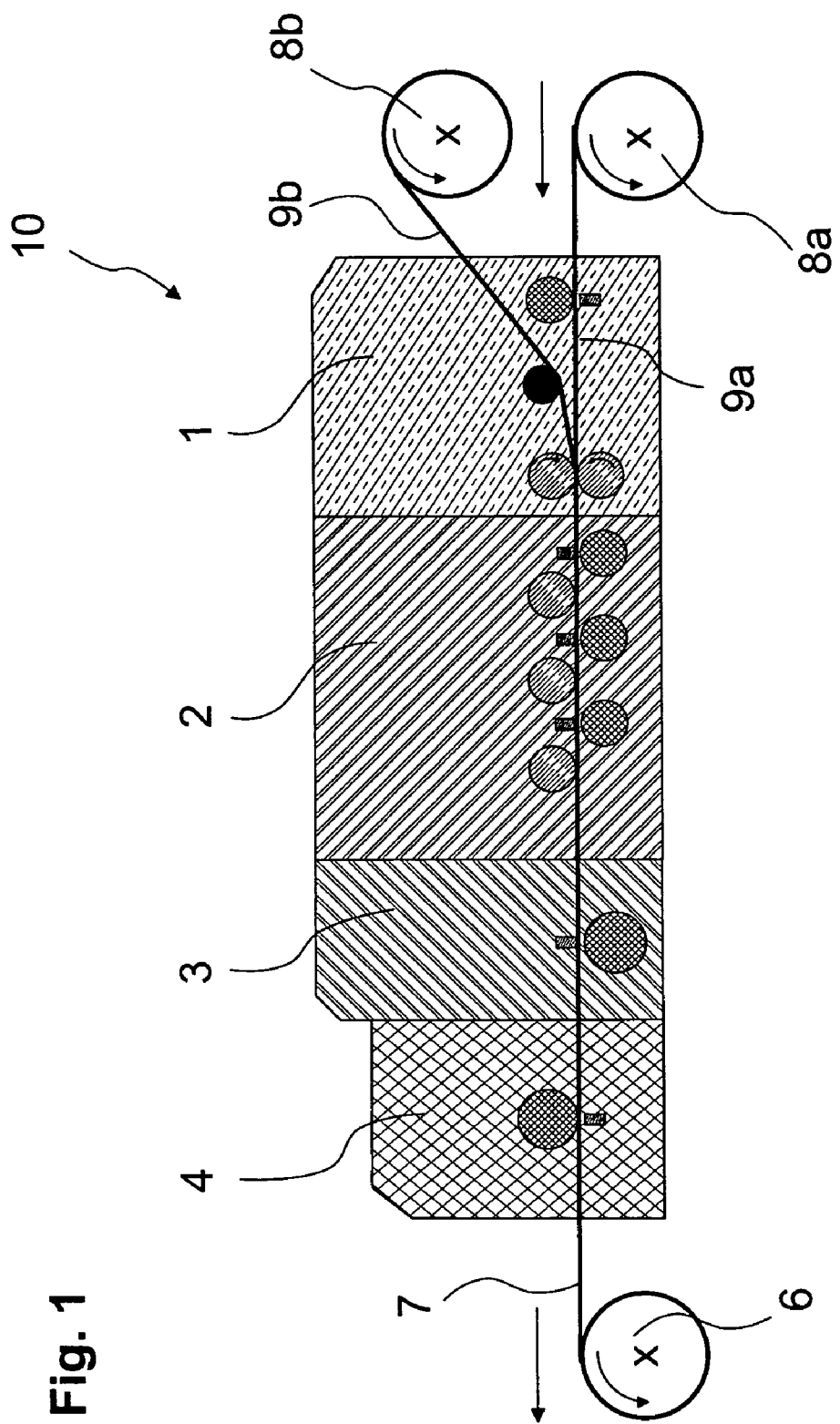
FIG. 1: a schematic representation of a production device for manufacturing a packaging material with a sealing layer.

The production device 10 contains an uncoiling device, a laminating station 1, a printing station 2, a print overlay coating station 3, a sealing coating station 4 and (not shown here) a coiling station (see FIG. 1). The uncoiling device contains two film rolls 8a, 8b from which a first and a second roll of strip-shaped film or film-type laminate 9a, 9b are unwound and fed continuously into the laminating station 1. In the laminating station 1 the first film 9a is laminated onto the second film 9b.

The film-type laminate is then passed through a printing station 2 in which printing 12 is applied to one or both free surfaces of the film-type laminate (see also FIG. 2) using an electrophotographic process.

After the printing, the film-type laminate is passed through the print overlayer station 3 which follows on from printing station 2. Here a lacquer print overlayer coating 13 is deposited either over the whole or only part of the printed surface of the film-type laminate.

Following the print overlayer station 3 is the sealing layer station 4 in which the free side, opposite that bearing the printing 12, is coated in part with a hot-sealing layer 14.

The deposition of the hot-sealing layer 14 at the sealing layer station 4 is carried out using an electrophotographic process. Each sealing layer 4 also has a heating unit (not shown here) associated with it in which the hot-sealing layer 14 is melted to form a sealing film that adheres to the substrate film surface and subsequently is solidified.

The finished film-type laminate 7 is then wound onto a film coiling roll 6 for further processing.

Figure 2:
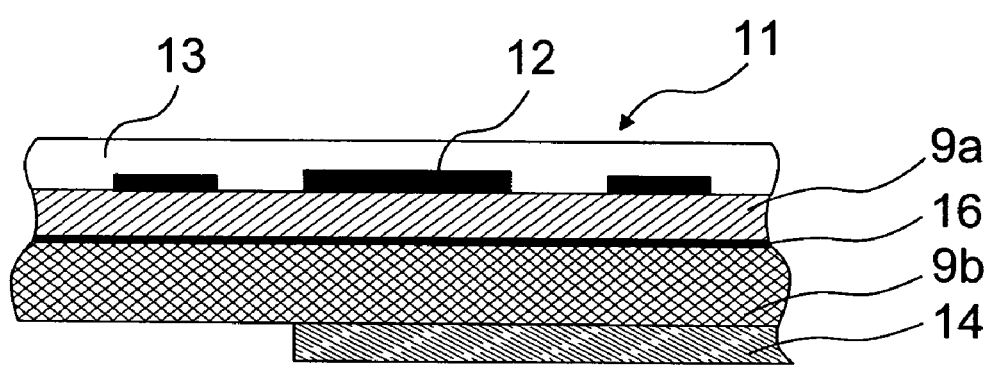
FIG. 2: a cross-section through a packaging material manufactured according to the invention.

A film-type laminate 11 in FIG. 2 manufactured using the process according to the invention contains a first film 9a and a second film 9b which are laminated together using an adhesive layer 16. Printing 12 is applied to the first free surface of the film-type laminate 11. A print overlayer coating 13 is deposited on top of the printing.

A hot-sealing layer 14 is deposited—on those areas that are to be sealed—on the free surface of the film-type laminate 11 opposite that bearing the printing. 12.

The invention claimed is:

1. A process comprising manufacturing a flexible packaging material from a single or multi-layer film or film laminate (7) containing a hot sealing layer (14), deposited on at least one free surface of the film or film laminate (7), said manufacturing including depositing the sealing layer (14) locally, on areas to be sealed, using an electrostatic coating process in which coating particles, that are composed of a hot-sealing adhesive that can be thermally activated, are electrostatically charged and transferred to the film or film laminate surface to be coated using transfer means for applying an electric field, to provide a coating layer, which is subsequently solidified, the adhesive properties of the coating layer being reactivated upon heating during a subsequent sealing operation.

2. The process according to claim 1, wherein the sealing layer is deposited on the film or film laminate using a process employing EMS technology (Electro-Magnetic-Brush Technology) and two-component developer system.

3. The process according to claim 1, wherein the sealing layer (14) is deposited on the film or film laminate by means of an electrophotographic process.

4. The process according to claim 1, wherein the coating particles of the sealing layer (14) are in the form of dry particles.

5. The process according to claim 4, wherein the coating particles of the sealing layer (14) are in the form of a powder lacquer.

6. The process according to claim 1, wherein the coating particles of the sealing layer (14) are deposited using electronic data processing means, forming on the film or film laminate (7) a pattern of the areas to be sealed.

7. The process according to claim 1, wherein the thickness of the sealing layer (14) is monitored and/or regulated by means for electronic data processing during deposition of the sealing layer.

8. The process according to claim 1, wherein the deposition of the sealing layer takes place in-line and continuously at a sealing station (4) in a film production line (10).

9. The process according to claim 2, wherein the sealing layer (14) is deposited on the film or film laminate by means of an electrophotographic process.

10. The process according to claim 3, wherein the coating particles of the sealing layer (14) are in the form of dry particles.

11. The process according to claim 5, wherein the sealing layer (14) is a hot-sealing layer.

12. The process according to claim 1, wherein the coating particles of the sealing layer (14) are deposited using electronic data processing means, forming on the film or film laminate (7) a pattern of the areas to be sealed.

13. The process according to claim 6, wherein the thickness of the sealing layer (14) is monitored and/or regulated by means for electronic data processing during deposition of the sealing layer.

14. The process according to claim 7, wherein the deposition of the sealing layer takes place in line and continuously at a sealing station (4) in a film production line (10).

15. The process according to claim 4, wherein said coating particles are in the form of dry powder particles.

16. The process according to claim 10, wherein said coating particles are in the form of dry powder particles.

17. The process according to claim 5, wherein said coating particles are in the form of a thermoplastic powder lacquer.

18. The process according to claim 10, wherein said coating particles are in the form of a thermoplastic powder lacquer.

19. The process according to claim 1 wherein the coating particles contain an additive that enables the coating particles to be electrostatically charged to exhibit tribo-electric properties by means of friction.

20. The process according to claim 1, wherein the hot-sealing layer is selected from the group consisting of polyolefin-based polymers or copolymers, acrylates, methacrylates, vinylchloride, vinylidenchloride, vinylacetate, polyamide, polyesters, polyurethanes, and mixtures thereof.

21. The process according to claim 1, wherein the coating particles are powder particles or powder lacquer particles, after being coated on the film or the film laminate, are heated to 70 to 80° C., and then melted in a heating unit.

22. The process according to claim 21, wherein the heating unit is an infrared radiation heating unit, a near infrared radiation heating unit, or heated rolls.

23. The process according to claim 1, wherein coated sealing layer has a thickness of 7 to 100 μm.

24. The process according to claim 2, wherein the two components in the two-component developer system are ferromagnetic particles and the coating particles.

* * * * *